(12) United States Patent
Lee et al.

(10) Patent No.: US 7,593,059 B2
(45) Date of Patent: Sep. 22, 2009

(54) IMAGE CONVERSION DEVICE AND METHOD

(75) Inventors: Young-ho Lee, Yongin-si (KR); Seung-joon Yang, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 644 days.

(21) Appl. No.: 11/237,958

(22) Filed: Sep. 29, 2005

(65) Prior Publication Data

US 2006/0077289 A1 Apr. 13, 2006

(30) Foreign Application Priority Data

Oct. 9, 2004 (KR) .................. 10-2004-0080705

(51) Int. Cl.
*H04N 7/01* (2006.01)

(52) U.S. Cl. ...................... 348/441; 348/452

(58) Field of Classification Search .............. 348/441, 348/448, 446, 451, 452, 443, 459; *H04N 7/01, H04N 11/20*
See application file for complete search history.

(56) References Cited

U.S. PATENT DOCUMENTS

| | | | |
|---|---|---|---|
| 5,428,399 A | 6/1995 | Robinson et al. | |
| 5,446,497 A | 8/1995 | Keating et al. | |
| 5,610,662 A | 3/1997 | Hackett | |
| 5,943,099 A | 8/1999 | Kim | |
| 6,630,961 B1 | 10/2003 | Shin et al. | |
| 7,321,396 B2 * | 1/2008 | Jung et al. | ................. 348/452 |
| 2002/0075400 A1 | 6/2002 | Shin et al. | |
| 2004/0070686 A1 | 4/2004 | Jung et al. | |

FOREIGN PATENT DOCUMENTS

| | | |
|---|---|---|
| KR | 2001-26089 A | 4/2001 |
| KR | 2002-1951 A | 1/2002 |

OTHER PUBLICATIONS

Dutch Search Report dated Feb. 20, 2008 issued in NL 1030136.

* cited by examiner

*Primary Examiner*—Sherrie Hsia
(74) *Attorney, Agent, or Firm*—Stanzione & Kim, LLP

(57) ABSTRACT

An image conversion device and method of interpolating an input image by utilizing a motion estimation that is adaptive according to characteristics of the input image. The image conversion device includes a detection block to receive three consecutive input fields including a first field, a second field as a target interpolation field, and a third field, to determine which of the first field and the third field has a smaller difference value of field data with respect to the second field that is an interpolation target field, and to determine whether one of the first and third fields have a motion change that is greater than a predetermined threshold with respect to the second field, and an interpolation block to interpolate the second field by determining a selected motion estimation value between the one of the first and third fields having the smaller difference value and the second field, determining a third motion estimation value between the first field and the third field, applying different weights to the selected and third motion estimation values depending on whether one of the first and second fields have the motion change that is greater than the predetermined threshold, and mixing the weighted selected and third motion estimation values.

35 Claims, 5 Drawing Sheets

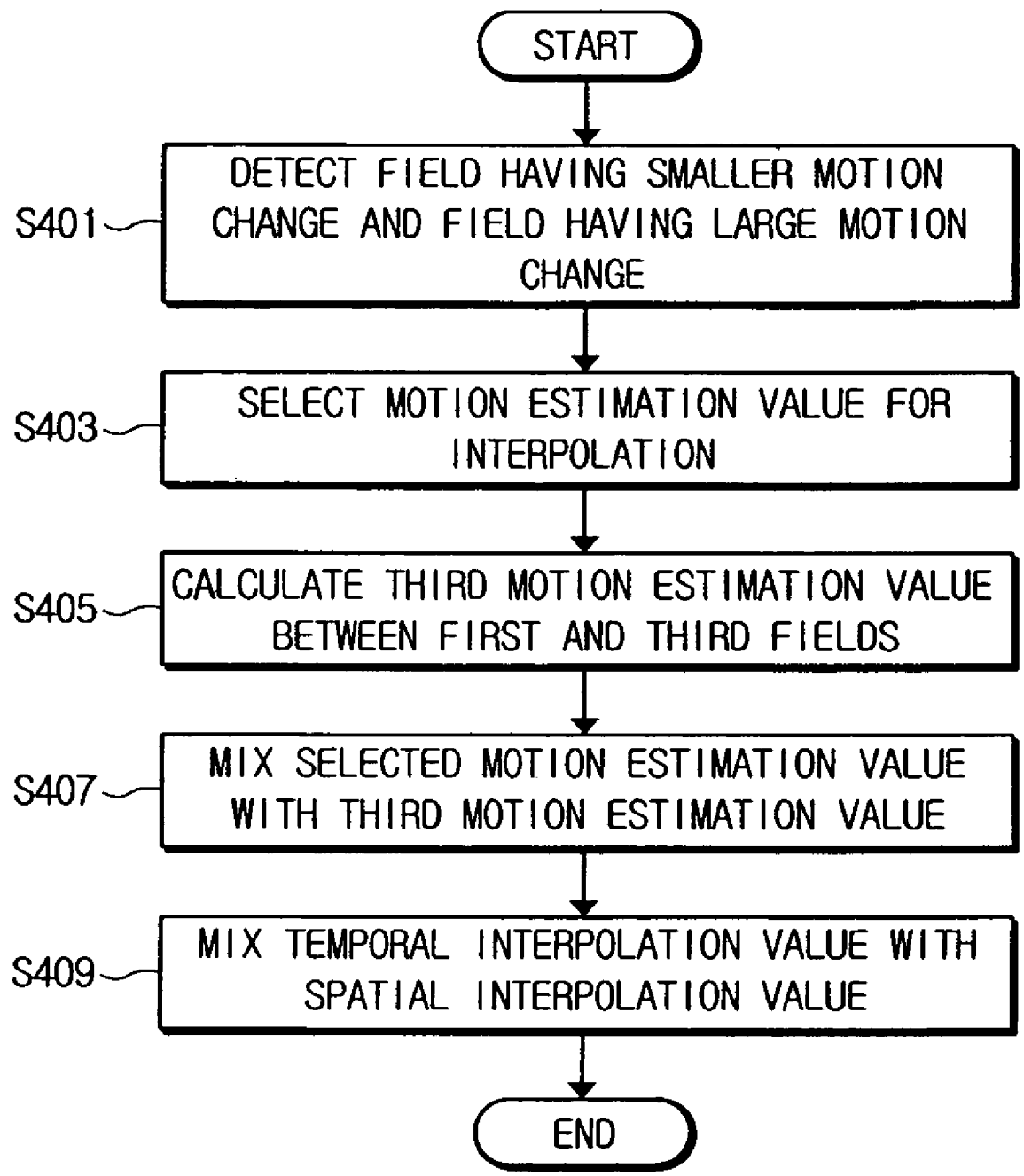

IMAGE CONVERSION DEVICE AND METHOD

CROSS-REFERENCE TO RELATED APPLICATIONS

This application claims the benefit under 35 U.S.C. § 119 of Korean Patent Application No. 2004-80705 filed on Oct. 9, 2004 in the Korean Intellectual Property Office, the entire content of which is incorporated herein by reference.

BACKGROUND OF THE INVENTION

1. Field of the Invention

The present general inventive concept relates in general to an image conversion device and method, and more specifically, to an image conversion device and a method to interpolate an input image by utilizing a motion estimation that is adaptive to characteristics of the input image.

2. Description of the Related Art

Cinema films are typically recorded at 24 frames per second. Each frame is instantly stored on film and shot on a screen at one time, producing a progressive image together. On the other hand, TVs have different image processing speeds (or frame rates) that depend on TV transmission systems. For instance, NTSC (National Television System Committee) video runs at 30 frames per second, whereas PAL (Phase Alternation Line) or SECAM (Sequential Couleur Memoire) video runs at 25 frames per second. Since TV broadcast transmits an image using radio waves, a number of scanning lines of each frame ranges several hundreds for photographing and transmission thereof, and the image is displayed through scanning.

In order to show motion pictures more effectively using a limited number of scanning lines, TV uses an interlacing method where a frame is divided into two fields, which are alternately scanned. Therefore, a system that uses the NTSC video processes an image at 60 fields per second, whereas a system that uses the PAL or SECAM video processes an image at 50 fields per second.

On the other hand, when a cinema film is played back on a TV monitor at a TV frame rate, an image on an NTSC television system (which runs at 30 frames per second) will look faster, because the number of frames per second differs in a movie screen and the TV monitor. Therefore, when transmitting the cinema film to the NTSC television system, 60 fields should be obtained from 24 frames per second, namely, 5 fields from 2 frames, to synchronize the two frame rates. In general, a 3:2 pull-down technique is most commonly used for converting 24 frames per second of a motion picture material to 60 fields per second. In the 3:2 pull-down, one film frame is scanned three times and a next frame is scanned twice. On the other hand, when the cinema film is played back on a PAL television system or SECAM television system, 50 fields should be created from 25 frames per second, i.e., 2 fields from each frame. This method is called a 2:2 pull-down, where each film frame is scanned twice.

FIG. 1 is a diagram illustrating a conventional image conversion method.

Referring to FIG. 1, a single frame of a film is composed of a top field with odd lines and a bottom field with even lines. To create 3 fields for cinema film to video conversion, one of the top and bottom fields of each frame is repeated. An input image is an interlaced image, where $A^T$ denotes a top field of a frame A, $A_B$ denotes a bottom field of the frame A, $B^T$ denotes a top field of a frame B, and $B_B$ denotes a bottom field of the frame B. Suppose that the input image needs to be converted to a progressive image, and $A_B$ is the field that needs to be interpolated. At first, a motion estimation ($MEA^TB^T$) is performed using neighboring fields $A^T$ and $B^T$ for the interpolation of $A_B$.

However, if motion of hu T used for the interpolation of $A_B$ is large, the interpolation that uses the motion estimation based on top fields of $A^T$ and $B^T$ causes judder in the interpolated frame A. In particular, a mean value of motion estimations calculated based on $A^T$ and $B^T$ is closer to a pixel value of $B^T$. Thus, when this motion estimation is used, judder occurs in the interpolated frame A.

SUMMARY OF THE INVENTION

The present general inventive concept provides an image conversion device and method of image compensation using adaptive motion estimation that depends on whether there is a large motion change in a field used for the interpolation.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an image conversion device, including a detection block to receive three consecutive input fields including a first field, a second field as an interpolation target field, and a third field, to determine which of the first field and the third field has a smaller difference value in field data with respect to the second field, and to determine whether one of the first and third fields have a motion change that is greater than a predetermined threshold with respect to the second field, and an interpolation block to interpolate the second field by determining a selected motion estimation value between the second field and the one of the first and third fields having the smaller difference value, determining a third motion estimation value between the first field and the third field, applying different weights to the selected and third motion estimation values depending on whether one of the first and third fields has the motion change that is greater than the predetermined threshold, and mixing the weighted selected and third motion estimation values.

The detection block may include a first field difference detector to detect a difference value of the field data of the first field and the second field, a second field difference detector to detect a difference value of the field data of the second field and the third field, a first comparer to compare the difference value of the field data of the first and second fields with the difference value of the field data of the second and third fields to detect the smaller difference value, a calculator to calculate a first absolute value of the difference value of the field data of the first and second fields, and a second absolute value of the difference value of the field data of the second and third fields, and a second comparer to compare the first and the second absolute values with a predetermined threshold, respectively, to determine whether one of the first and second absolute values is greater than the predetermined threshold.

The difference value in field data may be one of a difference in pixel value between fields, a difference in an amount of judder between fields, and a SAD (Sum of Absolute Difference) between fields.

The interpolation block may include a first motion estimation part to calculate a first motion estimation value between the first field and the second field, a second motion estimation part to calculate a second motion estimation value between the second field and the third field, a third motion estimation part to calculate a third motion estimation value between the first field and the third field, a MUX to select a smaller value between the first motion estimation value and the second motion estimation value as the selected motion estimation value according to a determination made by the detection unit, a first mixing part to mix the selected motion estimation value with the third motion estimation value according to the determination made by the detection unit of whether one of the first and third fields have the motion change that is greater than the predetermined threshold and to calculate a first interpolation value accordingly.

The MUX may select a motion estimation value between the first motion estimation value and the second motion estimation value according to whether the first or the third field has the smaller difference value in field data with respect to the second field.

If the detection unit determines that there is a field with a large change in motion, the first mixing part may assign a greater weight to the selected motion estimation value than the third motion estimation value, and mixes the weighted selected motion estimation value with the weighted third motion estimation value.

The interpolation block may further include a spatial interpolator to calculate a second interpolation value using field data of the second field, and a second mixing part to mix the first interpolation value with the second interpolation value according to the detection result provided by the detection unit to interpolate the second field.

If the detection unit determines that there is a field with a large change in motion, the second mixing part may assign a greater weight to the first interpolation value than the second interpolation value, and mixes the weighted first interpolation value with the weighted second interpolation value to determine an output image.

The foregoing and/or other aspects of the present general inventive concept may also be achieved by providing an image conversion apparatus, comprising a receiving unit to receive an image signal including a previous field, a next field, and a current field to interpolate, a detection unit to determine a first motion change between the previous field and the current field and a second motion change between the current field and the next field, and an interpolation unit to determine a motion estimation value between the current field and one of the previous and the next fields having a smaller change in motion according to the first and second motion changes, to determine another motion estimation value between the previous and the next fields, and to interpolate the current field according to the determined motion estimation values.

The foregoing and/or other aspects of the present general inventive concept may also be achieved by providing an interpolator usable with an image conversion apparatus that interpolates a current field from a previous field and a next field using motion estimation values between each of the previous, current, and next fields, the interpolator comprising a temporal interpolator including a first mixing unit to receive a motion estimation value between the current field and one of the previous and next fields have a smaller change in motion with respect to the current field and another motion estimation value between the previous field and the next field, and to mix the motion estimation values according to whether a large motion change occurs between the previous, current, and next fields to calculate a temporal interpolation value.

The foregoing and/or other aspects of the present general inventive concept may also be achieved by providing an image conversion method, the method comprising receiving three consecutive fields including a first field, a second field as an interpolation target field, and a third field, determining which of the first field and the third field has a smaller difference value of field data with respect to the second field, determining whether one of the first and the third fields have a motion change with respect to the second field that is greater than a predetermined threshold, and interpolating the second field by determining a selected motion estimation value between the second field and the one of the first and third fields having the smaller difference value, determining a third motion estimation value between the first field and the third field, applying different weights to the selected and third motion estimation values depending on whether one of the first field and the third field have the motion change that is greater than the predetermined threshold, and mixing the weighted selected and third motion estimation values.

The determining of which of the first and the third fields have the smaller difference value in field data with respect to the second field may include detecting a difference value of field data between the first field and the second field, and a difference value of field data between the second field and the third field, comparing the difference value of the first field and the second field data with the difference value of the second field and the third field to determine the smaller difference value. The determining of whether one of the first and the third fields have the motion change with respect to the second field that is greater than the predetermined threshold may include calculating a first absolute value of the difference value of the field data of the first and second fields, and a second absolute value of the difference value of the field data of the second and third fields, and comparing the first and the second absolute values with the predetermined threshold, respectively, and determining whether one of the first and the second absolute values is greater than the predetermined threshold.

The difference value in field data may be one of a difference in pixel value between fields, a difference in an amount of judder between fields, and a SAD (Sum of Absolute Difference) between fields.

The interpolating of the second field may include calculating a first motion estimation value between the first field and the second field, a second motion estimation value between the second field and the third field, and the third motion estimation value between the first field and the third field, selecting a smaller value between the first motion estimation value and the second motion estimation value as the selected motion estimation value, mixing the selected motion estimation value with the third motion estimation value according to the determination of whether the one of the first and the third fields have the motion change that is greater than the predetermined threshold, and calculating a first interpolation value accordingly.

The selecting of the smaller value between the first motion estimation value and the second motion estimation value may include selecting between the first motion estimation value and the second motion estimation value according to whether the first or the third field has the smaller difference value in field data with respect to the second field.

The first interpolation value may be obtained by assigning a greater weight to the selected motion estimation value than the third motion estimation value, and mixing the weighted selected motion estimation value with the weighted third motion estimation value.

The interpolating of the second field may further include calculating a second interpolation value using field data of the second field, and mixing the first interpolation value with the second interpolation value according to whether one of the first and the third fields have the motion change that is greater than the predetermined threshold to interpolate the second field.

If a field with a large change in motion is detected, a greater weight may be assigned to the first interpolation value than the second interpolation value, and the weighted first interpolation value may be mixed with the weighted second interpolation value to determine an output image.

The foregoing and/or other aspects of the present general inventive concept may also be achieved by providing a method of converting an image, the method comprising receiving an image signal including a previous field, a next field, and a current field to interpolate, determining a first motion change between the previous field and the current field and a second motion change between the current field and the next field, determining a motion estimation value between the current field and one of the previous and the next fields having a smaller change in motion according to the first and second motion changes, and another motion estimation value between the previous and the next fields, and interpolating the current field according to the determined motion estimation values.

The foregoing and/or other aspects of the present general inventive concept may also be achieved by providing a method of converting an image, the method comprising interpolating a current field using data from a previous field, the current field, and a next field by mixing a motion estimation value between the current field and a selected one of the previous and next fields having a smaller change in motion with respect to the current field with another motion estimation value between the previous and next fields.

The foregoing and/or other aspects of the present general inventive concept may also be achieved by providing a computer readable medium containing executable code to convert an image, the medium comprising a first executable code to receive an image signal including a next field, a previous field, and a current field to interpolate, a second executable code to determine a first motion change between the previous field and the current field and a second motion change between the current field and the next field, a third executable code to determine a motion estimation value between the current field and one of the previous and the next fields having a smaller change in motion according to the first and second motion changes, and another motion estimation value between the previous and the next fields, and a fourth executable code to interpolate the current field according to the determined motion estimation values.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 5 is a flow chart illustrating an image conversion method according to an embodiment of the present general inventive concept.

DETAILED DESCRIPTION OF THE PREFERRED EMBODIMENTS

Figure 1:
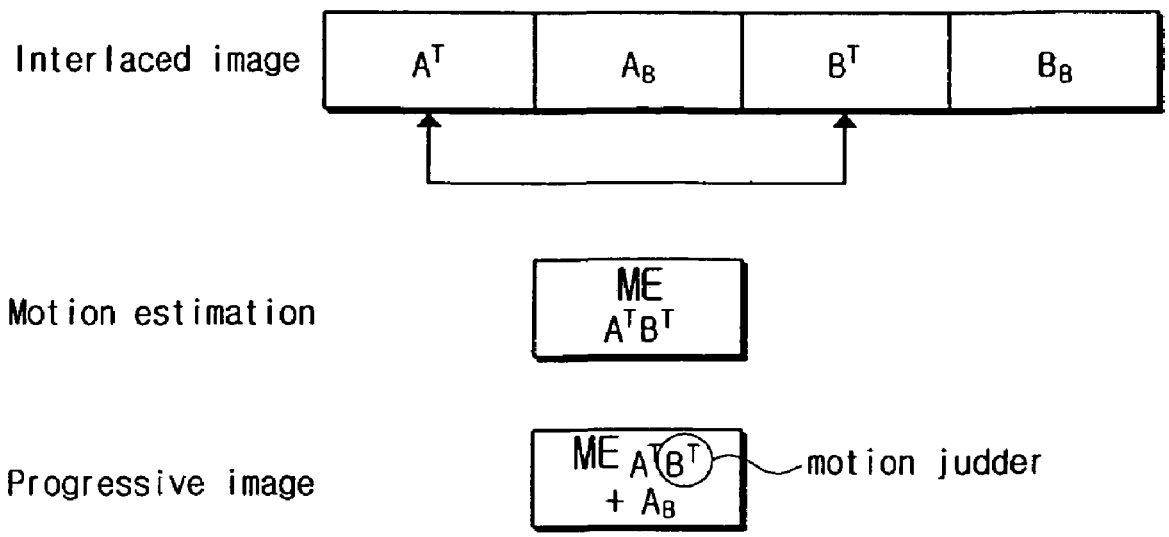
FIG. 1 is a diagram illustrating a conventional image conversion method.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
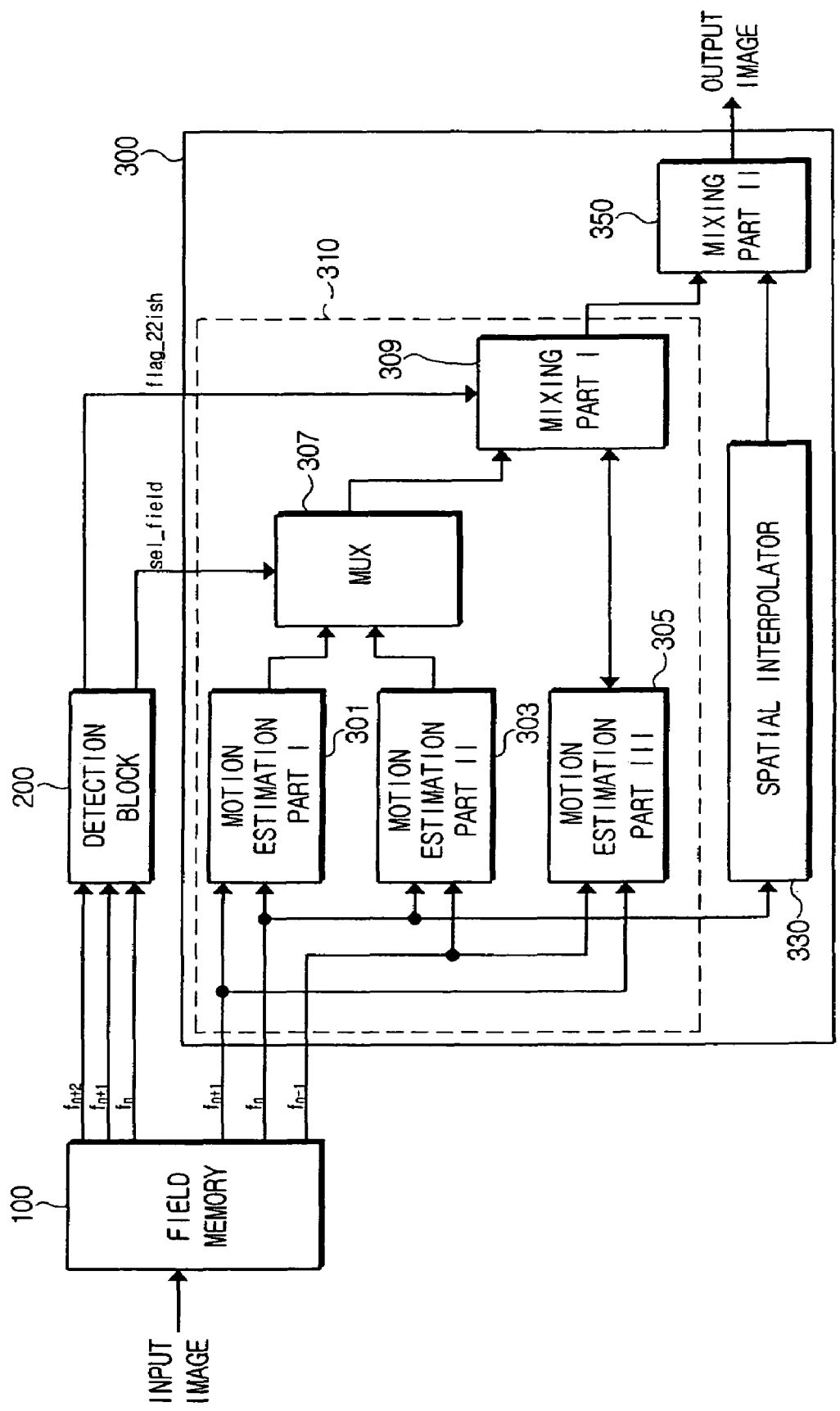
FIG. 2 is a block diagram illustrating an image conversion device according to an embodiment of the present general inventive concept.

FIG. 2 is a block diagram illustrating an image conversion device according to an embodiment of the present general inventive concept.

Referring to FIG. 2, the image conversion device includes a field memory 100, a detection block 200, and an interpolation block 300.

The field memory 100 stores an input image including a plurality of fields.

The detection block 200 selects a field with a smaller change in motion from among three temporally consecutive fields stored in the field memory 100. That is, among a first field, a second field, and a third field, the detection block 200 selects either the first field or the third field having the smaller change in motion with respect to the second field. Throughout the description, the second field is assumed to be the field to be interpolated or a target interpolation field. In addition, the detection block 200 detects whether there is a field with a large change in motion with respect to the second field from among the first field and the third field. To select the field with the smaller change in motion and to detect a field with a large change in motion, the detection block 200 uses a difference value in field data between the first and second fields and a difference value in field data between the third and second fields. For instance, if the difference value in the field data between the first and second fields and/or the difference value in the field data between the third and second fields is small, the detection block 200 decides that both of the first and third fields have moved very slightly with respect to the second field. Similarly, if the difference value in the field data between the first and second fields, and/or the difference value in the field data between the third and second fields is great, the detection block 200 decides that there is a field (i.e., either the first field of the third field) that has a large change in motion with respect to the second field. Here, examples of the difference value of the field data between the fields include a difference in pixel value between the fields, a difference in an amount of judder between the fields, or an SAD (Sum of Absolute Difference) between the fields.

The interpolation block 300 includes a temporal interpolator 310, a spatial interpolator 330, and a second mixing part (mixing part II) 350. Here, the temporal interpolator 310 includes a first motion estimation part 301, a second motion estimation part 303, a third motion estimation part 305, a MUX 307, and a first mixing part (mixing part I) 309.

The temporal interpolator 310 mixes a smaller value among motion estimation values between fields with respect to the second field out of the three consecutive fields (i.e., the first field, the second field and the third field) and a motion estimation value between the first field and the third field. In particular, the first motion estimation part 301 calculates a first motion estimation value between the first field and the second field, the second motion estimation part 302 calculates a second motion estimation value between the second field and the third field, and the third motion estimation part 303 calculates a third motion estimation value between the first field and the third field. That is, the first motion estimation part 301 and the second motion estimation part 302 calculate a motion estimation value between two consecutive fields having different parities, respectively. On the other hand, the third motion estimation part 303 calculates a motion estimation value between the first field and the third field, which are two fields having the same parity. Here, two fields have the same parity, when the two fields are two top fields or two bottom fields.

The MUX 307 selects a motion estimation value calculated from the field having the smaller change in motion with respect to the second field according to a signal "sel_field" received from the detection block 200 that indicates the field having the smaller change in motion with respect to the second field. Accordingly, the MUX 307 selects a smaller change in motion between the first motion estimation value and the second motion estimation value according to the signal "sel_field" received from the detection block 200. For instance, if the first field is selected by the detection block 200 as the field having the smaller motion change, the MUX 307 selects and outputs the first motion estimation value calculated between the first field and the second field as the selected motion estimation value instead of the second motion estimation value.

The first mixing part 309 of the temporal interpolator 310 mixes the motion estimation value selected by the MUX 307 (i.e., either the first or second motion estimation value) depending on whether detection block 200 determines that there is a field having a large change in motion with respect to the second field, and the third motion estimation value calculated by the third motion estimation part 305. In particular, if the detection block 200 detects a field having a large change in motion with respect to the second field, the detection block 200 produces a signal "flag_22ish" to control the first mixing part 309 to assign a greater weight to the motion estimation value selected by the MUX 307. On the other hand, if the detection block 200 detects no field having a large change in motion with respect to the second field, the signal "flag_22ish" controls the first mixing part 309 to assign the greater weight to the third motion estimation value. Accordingly, the selected motion estimation value is mixed with the third motion estimation value calculated by the third motion estimation part 305 to yield a first interpolation value. Thus, when there is a field having a large change in motion, by assigning the greater weight to the selected motion estimation value, which only depends on the field having the smaller change in motion with respect to the second field and the second field itself, instead of the third motion estimation value, the first mixing part 309 does not base the temporal interpolation on the field having the large change in motion. In this case, the third motion estimation value, which is based on both the field having the smaller change and the field having the large change in motion with respect to the second field, is assigned a smaller weight such that the temporal interpolation is affected less by the field having the large change in motion. Similarly, when there is no field having a large change in motion with respect to the second field, the third motion estimation value, which depends on both fields that temporally surround the second field (i.e., the first and the third fields), can be assigned a larger weight than the selected motion estimation value by the first mixing part 309. Accordingly, the second field can be temporally interpolated by the temporal interpolator 310.

Therefore, in the interpolation of the second field, the greater weight is assigned to a motion estimation value of the field having the smaller change in motion with respect to the second field, and a motion estimation value the field with a large change in motion is still mixed therewith with the smaller weight for interpolation. In this manner, it becomes possible to reduce a problem caused by judder that usually occurs as a result of assigning the same weight to all motion estimation values in interpolation. As illustrated in FIG. 2, the signal "flag_22ish" is input by the detection block 200 to the first mixing part 309 to indicate that a field with a large change in motion with respect to the second field exists among the first and the third fields.

The spatial interpolator 330 of the interpolation block 300 executes an interpolation operation on an interpolation target field (i.e., the second field) using the field data of the second field. In other words, in order to interpolate the second field, the spatial interpolator 330 does not need to use the field data of the first field or the third field, both being temporally consecutive to the second field. Instead, the spatial interpolator 330 uses the field data of the interpolation target field which is the second field, in this case.

The second mixing part 350 of the interpolation block 300 mixes the first interpolation value of the temporal interpolator 310 and the second interpolation value of the spatial interpolator 330, depending on the detection result provided by the detection block 200 regarding whether there is a field with a large change in motion with respect to the second field. If the detection block 200 detects such a field and indicates this detection result by the signal flag_22ish, the second mixing part 350 assigns a larger weight to the first interpolation value of the temporal interpolator 310, and mixes the first and second interpolation values together to determine an output image.

On the other hand, if the detection block 200 detects no such field with a large change in motion with respect to the second field and indicates this detection result by the signal flag_22ish, the second mixing part 350 assigns a larger weight to the second interpolation value of the spatial interpolator 330, and mixes the first and second interpolation values together to determine an output image.

Figure 3:
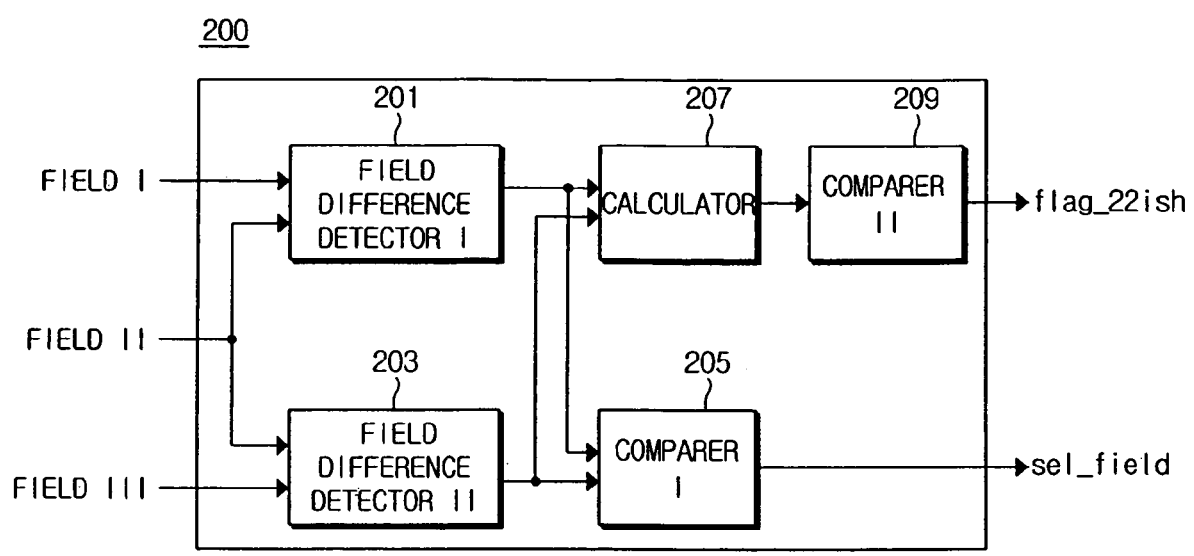
FIG. 3 is a block diagram illustrating a detection block of the image conversion device of FIG. 2 according to an embodiment of the present general inventive concept.

FIG. 3 is a block diagram illustrating the detection block 200 of the image conversion device of FIG. 2 according to an embodiment of the present general inventive concept.

Referring to FIG. 3, the detection block 200 includes a first field difference detector 201, a second field difference detector 203, a first comparer 205, a calculator 207, and a second comparer 209.

The first field difference detector 201 detects a difference value of field data between the first field and the second field from among three consecutive input fields including the first field, the second field, and the third field. Likewise, the second field difference detector 203 detects a difference value of field data between the second field and the third field. Here, examples of the difference value of field data between the fields include a difference in a pixel value between the fields, a difference in an amount of judder between the fields, and an SAD (Sum of Absolute Difference) between the fields.

The first comparer 205 detects a smaller difference value of the field data between the difference value of the field data of the first field and the second field and the difference value of the field data of the second field and the third field. Accordingly, the first comparer 205 selects the field having the smaller change in motion with respect to the second field, between the first field and the third field. In other words, one of the first field and the third field is selected as a field having a smaller field data difference from the second field, and the result of the selection is output to the MUX 307 as the signal "sel_field." In short, the field having the smaller difference value in field data corresponds to the field having the smaller change in motion with respect to the second field.

The calculator 207 calculates an absolute value of the difference value of the first field difference detector 201 and an absolute value of the difference value of the second field difference detector 203, respectively.

The second comparer 209 compares the absolute values received from the calculator 207 with a predetermined threshold to determine whether there is a field with a large change in motion with respect to the second field. That is, if the calculated absolute value of one of the difference values of the first or second field difference detectors 201 or 203 is greater than the predetermined threshold, the second comparer 209 determines that a field with a large change in motion with respect to the second field exists. The comparison result is then output to the first mixing part 309 (see FIG. 2) as the flag_22ish signal.

Figure 4:
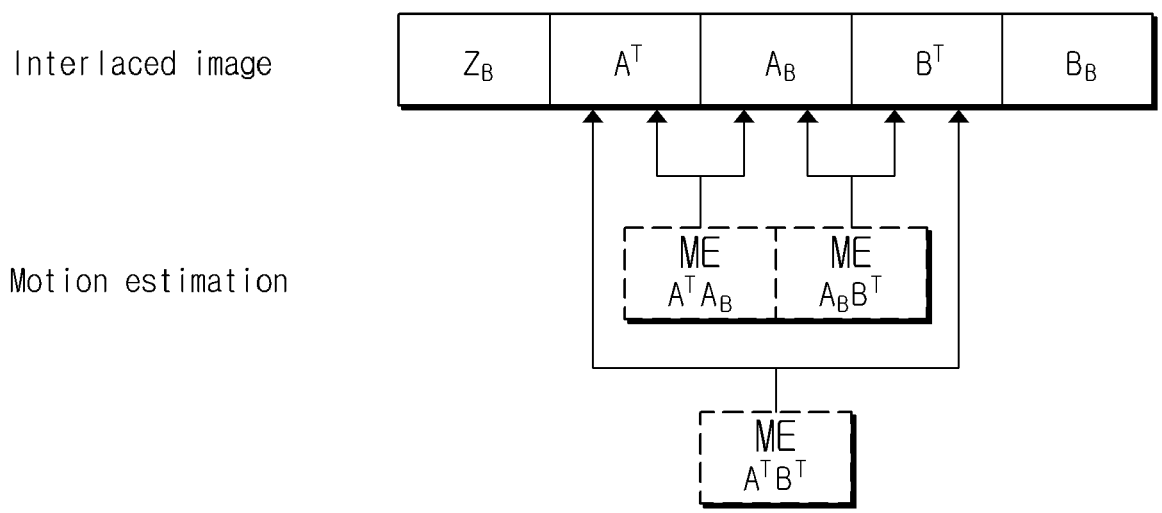
FIG. 4 is a diagram illustrating an image conversion method according to an embodiment of the present general inventive concept.

FIG. 4 is a diagram illustrating an image conversion method according to an embodiment of the present general inventive concept.

Referring to FIG. 4, a motion estimation value is calculated using three consecutive input fields $A^T$ (i.e., the first field), $A_B$, (i.e., the second field) and $B^T$ (i.e., the third field), and performs temporal interpolation on $A_B$ using motion estimation values calculated. Here, the first field $A^T$ denotes the top field of a frame A, and the third field $B^T$ denotes the top field of a frame B. Additionally, the second field $A_B$ can be a current field to be interpolated, and denotes the bottom field of the frame A.

A first motion estimation value between the first field $A^T$ and the second field $A_B$ ($MEA^T A_B$) is calculated. A second motion estimation value between the second field $A_B$ and the third field $B^T$ ($MEA_B B^T$) is also calculated. Further, a third motion estimation value between the first field $A^T$ and the third field $B^T$ ($MEA^T B^T$) is also calculated. As described above with respect to the embodiments of FIGS. 2 and 3, a smaller value between $MEA^T A_B$ and $MEA_B B^T$ (i.e., representing the smaller change in motion between the first and third fields with respect to the second field) is mixed with the third motion estimation value $MEA^T B^T$ to be used as a motion estimation value for the interpolation of the second field (i.e., the first interpolation value or the temporal interpolation value, described above). For instance, suppose that the smaller value between $MEA^T A_B$ and $MEA_B B^T$ is $MEA^T A_B$ (i.e., the first motion estimation value). The motion estimation value for use in the interpolation can then be expressed as follows.

$$W*MCA^T A_B + (1-W)* MCA^T B^T + A_B \quad [\text{Equation 1}]$$

where W and (1−W) represent weights. Additionally, in Equation 1, $MCA^T A_B$ represents motion compensation (motion estimation value) between the first field $A^T$ and the second field $A_B$ by motion estimation, and $MCA^T B^T$ represents a motion compensation (motion estimation value) between the first field $A^T$ and the third field $B^T$ by motion estimation. The weights W and (1−W) differ depending on whether one of the first field $A^T$ or the third field $B^T$ has a large change in motion with respect to the second field $A_B$. If there is a field with a large change in motion, a motion compensation of the field with the large change in motion (i.e., $MCA^T B^T$) may be assigned a weight that is 0.5 less than a motion compensation of the other field. In other words, if there is a large change in motion in either of the first or third field, the greater weight (e.g., W) may be assigned to the motion compensation value that corresponds to the selected motion estimation value, which is $MCA^T A_B$ in this case. Conversely, if there is no large change in motion in either the first or third field, the larger weight (e.g., W) may be assigned to the motion compensation value that corresponds to the third motion estimation value, which is $MCA^T B^T$ in this case. In Equation 1, $W*MCA^T A_B + (1-W) * MCA^T B^T$, except for the second field $A_B$, corresponds to the first interpolation value (i.e., the temporal interpolation value of the second field).

FIG. 5 is a flow chart illustrating an image conversion method according to an embodiment of the present general inventive concept. The method of FIG. 5 may be performed by the image conversion device illustrated in FIG. 2. Accordingly, the method of FIG. 5 is described below with reference to FIGS. 2 through 5.

Referring to FIGS. 2 to 5, among three consecutive fields, i.e., the first field, the second field, and the third field, stored in the field memory 100 one of the first field and the third field having the smaller change in motion with respect to the second field is detected (operation S401). Additionally, it is determined whether one of the first or third fields has a large change in motion with respect to the second field (operation S401). A first difference value of the field data of the first field and the second field and a second difference value of the field data of the second field and the third field are determined and compared, and a smaller difference value of the first and second difference values is determined. Here, the first or third field having the smaller difference value in field data corresponds to the field having the smaller change in motion with respect to the second field.

In addition, the first difference value of the field data of the first and second fields and the second difference value of the field data of the second and third fields are compared with the predetermined threshold, respectively. If one of the first and second difference values is larger than the predetermined threshold, it is determined that there has been a large change in motion with respect to the second field (i.e., in the first or third field with respect to the second field).

Using the first field, the second field, and the third field, a motion estimation value for use in the interpolation of the second field (i.e., the temporal interpolation) is selected (operation S403). Then, the first motion estimation value that is the motion estimation value between the first field and the second field, and the second motion estimation value that is the motion estimation value between the second field and the third field are calculated. Here, the first or second motion estimation value involving the first or third field having the smaller change in motion with respect to the second field is selected as the motion estimation value for use in the interpolation of the second field (i.e., the temporal interpolation).

The third motion estimation value is also calculated using the first field and the third field (operation S405).

Depending on whether a field with a large change in motion with respect to the second field exists, the motion estimation value selected from the first motion estimation value and the second motion estimation value (i.e., the selected motion estimation value) at operation S403 is mixed with the third motion estimation value (operation S407). If one of the first field and the third field is determined to have a large change in motion with respect to the second field, the greater weight is assigned to the selected motion estimation value, and the selected motion estimation value is mixed with the third motion estimation value. On the other hand, if there is no field having a large change in motion with respect to the second field, the greater weight is assigned to the third motion estimation value. Accordingly, the third motion estimation value and the selected motion estimation value are mixed together.

In other words, if there is a field (i.e., the first or third field) with a large change in motion with respect to the second field to be interpolated, the greater weight is assigned to a field that has a smaller difference of field data with respect to the field data of the second field (i.e., the other one of the first and third fields that does not have the large change in motion with respect to the second field). Therefore, it is possible to, more frequently, reduce judder that may occur when the second field is interpolated when using a field having a large change in motion with respect thereto in the interpolation.

Next, depending on whether there is a field with a large change in motion with respect to the second field, the first interpolation value of the temporal interpolator 310 and the second interpolation value of the spatial interpolator 330 are mixed to interpolate the current field, i.e., the second field (operation S409). If one of the first field and the third field has a large change in motion with respect to the second field, the greater weight is assigned to the first interpolation value of the temporal interpolator 310. If neither of the first nor third field has a large change in motion with respect to the second field, the greater weight is assigned to the second interpolation value of the spatial interpolator 330. The first interpolation value and the second interpolation value are then mixed to interpolate the second field.

The present general inventive concept may be embodied in hardware, software, or a combination thereof. For example, the present general inventive concept may be embodied by a computer running a program from a computer-readable medium, including but not limited to storage media such as magnetic storage media (ROMs, RAMs, floppy disks, magnetic tapes, etc.), optically readable media (CD-ROMs, DVDs, etc.). The present general inventive concept may be embodied as a computer-readable medium having a computer-readable program code to cause a number of computer systems connected via a network to effect distributed processing.

As described above, according to the various embodiments of the present general inventive concept, a current field is interpolated to a progressive image by adaptively applying motion estimation of a field having a large change in motion with respect to the current field to be interpolated. As a result, judder and the negative effects thereof can be substantially reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image conversion device, comprising:
 a detection block to receive three consecutive input fields including a first field, a second field as an interpolation target field, and a third field, to determine which of the first field and the third field has a smaller difference value in field data with respect to the second field, and to determine whether one of the first and third fields has a motion change that is greater than a predetermined threshold with respect to the second field; and
 an interpolation block to interpolate the second field by determining a selected motion estimation value between the second field and the one of the first and third fields having the smaller difference value, determining a third motion estimation value between the first field and the third field, applying different weights to the selected and third motion estimation values depending on whether one of the first and third fields has the motion change that is greater than the predetermined threshold, and mixing the weighted selected and third motion estimation values.

2. The device according to claim 1, wherein the difference value in field data is one of a difference in pixel value between fields, a difference in an amount of judder between fields, and a SAD (Sum of Absolute Difference) between fields.

3. The device according to claim 1, wherein the detection block comprises:
 a first field difference detector to detect a first difference value of the field data of the first field and the second field;
 a second field difference detector to detect a second difference value of the field data of the second field and the third field;
 a first comparer to compare the first difference value of the field data of the first and second fields with the second difference value of the field data of the second and third fields to detect the smaller difference value;
 a calculator to calculate a first absolute value of the first difference value of the field data of the first and second fields, and a second absolute value of the second difference value of the field data of the second and third fields; and
 a second comparer to compare the first and the second absolute values with the predetermined threshold, respectively, to determine whether one of the first and second absolute values is greater than the predetermined threshold.

4. The device according to claim 3, wherein the difference value in field data is one of a difference in pixel value between fields, a difference in an amount of judder between fields, and a SAD (Sum of Absolute Difference) between fields.

5. The device according to claim 1, wherein the interpolation block comprises:
 a first motion estimation part to calculate a first motion estimation value between the first field and the second field;
 a second motion estimation part to calculate a second motion estimation value between the second field and the third field;
 a third motion estimation part to calculate the third motion estimation value between the first field and the third field;
 a MUX to select a smaller value between the first motion estimation value and the second motion estimation value as the selected motion estimation value according to a determination made by the detection unit;
 a first mixing part to mix the selected motion estimation value with the third motion estimation value according to the determination made by the detection block of whether one of the first and third fields have the motion change that is greater than the predetermined threshold, and to calculate a first interpolation value accordingly.

6. The device according to claim 5, wherein the MUX selects between the first motion estimation value and the second motion estimation value according to whether the first or the third field has the smaller difference value in field data with respect to the second field.

7. The device according to claim 5, wherein, if the detection unit determines that there is a field with a large change in motion, the first mixing part assigns a greater weight to the selected motion estimation value than the third motion estimation value, and mixes the weighted selected motion estimation value with the weighted third motion estimation value.

8. The device according to claim 5, wherein the interpolation block further comprises:
 a spatial interpolator to calculate a second interpolation value using field data of the second field; and
 a second mixing part to mix the first interpolation value with the second interpolation value according to the detection result provided by the detection block to interpolate the second field.

9. The device according to claim 8, wherein, if the detection block determines that there is a field with a large change in motion, the second mixing part assigns a greater weight to the first interpolation value than the second interpolation value, and mixes the weighted first interpolation value with the weighted second interpolation value to determine an output image.

10. An image conversion apparatus, comprising:
 a receiving unit to receive an image signal including a previous field, a next field, and a current field to interpolate;
 a detection unit to determine a first motion change between the previous field and the current field and a second motion change between the current field and the next field; and
 an interpolation unit to determine a motion estimation value between the current field and one of the previous and the next fields having a smaller change in motion according to the first and second motion changes, to determine another motion estimation value between the previous and the next fields, and to interpolate the current field according to the determined motion estimation values.

11. The apparatus according to claim 10, wherein the interpolation unit comprises a mixing unit to assign a first weight to the motion estimation value and a second weight to the another motion estimation value and to mix the weighted motion estimation values to determine a temporal interpolation value of the current field.

12. The apparatus according to claim 11, wherein:
 the detection unit determines whether either one of the first and second motion changes is a large motion change; and
 the mixing unit assigns a larger weight to the another motion estimation value when neither one of the motion changes is the large motion change and a smaller weight to the another motion estimation value when one of the motion changes is the large motion change.

13. The apparatus according to claim 12, wherein the detection unit comprises:
 a previous field difference unit to determine the first motion change between the previous and the current fields;
 a next field difference unit to determine the second motion change between the current and the next fields; and
 a first comparison unit to determine which of the first and second motion changes is smaller and to output an indication thereof to the interpolation unit.

14. The apparatus according to claim 13, wherein the detection unit further comprises:
 a second comparison unit to compare each of the first and second motion changes to a predetermined change threshold to determine whether the large motion change occurs between the previous, current, and next fields and to provide an indication thereof to the interpolation unit.

15. The apparatus according to claim 10, wherein:
 the interpolation unit performs a temporal interpolation of the current field according to:

$W*MCA^TA_B+(1-W)*MCA^TB^T+A_B$ when the smaller change in motion occurs between the previous and current fields, where $MCA^TA_B$ represents a motion compensation value between the previous field $A^T$ and the current field $A_B$, $MCA^TB^T$ represents a motion compensation value between the previous field $A^T$ and the next field $B^T$, and W represents a relative weight; and
 the interpolation unit performs a temporal interpolation of the current field according to:

$W*MCB^TA_B+(1-W)*MCA^TB^T+A_B$ when the smaller change in motion occurs between the current and next fields, where $MCB^TA_B$ represents a motion compensation value between the current field $A_B$ and the next field $B^T$, $MCA^TB^T$ represents a motion compensation value between the previous field $A^T$ and the next field $B^T$, and W represents a relative weight.

16. An interpolator usable with an image conversion apparatus that interpolates a current field from a previous field and a next field using motion estimation values between each of the previous, current, and next fields, the interpolator comprising:
 a temporal interpolator including a first mixing unit to receive a motion estimation value between the current field and one of the previous and next fields have a smaller change in motion with respect to the current field and another motion estimation value between the previous field and the next field, and to mix the motion estimation values according to whether a large motion change occurs between the previous, current, and next fields to calculate a temporal interpolation value.

17. The interpolator according to claim 16, wherein the first mixing unit assigns a first larger weight to the motion estimation value and a first smaller weight to the another motion estimation value when the large motion change occur between the previous, current, and next fields, and the first mixing unit assigns the first smaller weight to the motion estimation value and the first larger weight to the another motion estimation value when the large motion change does not occur between the previous, current, and next field.

18. The interpolator according to claim 16, further comprising:
 a spatial interpolator to interpolate the current field from current field data to calculate a spatial interpolation value; and
 a second mixing part to mix the temporal interpolation value and the spatial interpolation value to determine an output image by assigning a second larger weight to the temporal interpolation value and a second smaller weight to the spatial interpolation value when the large change in motion occurs between the previous, current, and next fields, and assigning the second smaller weight to the temporal interpolation value and the second larger weight to the spatial interpolation value when the large change in motion does not occur between the previous, current, and next fields.

19. An image conversion method, the method comprising:
 receiving three consecutive input fields including a first field, a second field as a target interpolation field, and a third field;
 determining which of the first field and the third field has a smaller difference value in field data with respect to the second field;
 determining whether one of the first and the third fields have a motion change with respect to the second field that is greater than a predetermined threshold; and interpolating the second field by determining a selected motion estimation value between the second field and the one of the first and third fields having the smaller difference value, determining a third motion estimation value between the first field and the third field, applying different weights to the selected and the third motion estimation values depending on whether one of the first field and the third field have the motion change that is greater than the predetermined threshold, and mixing the weighted selected and third motion estimation values.

20. The method according to claim 19, wherein the difference value in field data is one of a difference in pixel value between fields, a difference in an amount of judder between fields, and a SAD (Sum of Absolute Difference) between fields.

21. The method according to claim 19, wherein:
the determining of which of the first field and the third field has the smaller difference value in field data with respect to the second field comprises:
  detecting a difference value of field data between the first field and the second field, and a difference value of field data between the second field and the third field,
  comparing the difference value of the first field and second field with the difference value of the second field and the third field to determine the smaller difference value; and
the determining of whether one of the first field and the third field have the motion change with respect to the second field that is greater than the predetermined threshold comprises:
  calculating a first absolute value of the difference value of the field data of the first and second fields, and a second absolute value of the difference value of the field data of the second and third fields, and
  comparing the first and the second absolute values with the predetermined threshold, respectively, and determining whether one of the first and second absolute values is greater than the predetermined threshold.

22. The method according to claim 21, wherein the difference value in field data is one of a difference in pixel value between fields, a difference in an amount of judder between fields, and a SAD (Sum of Absolute Difference) between fields.

23. The method according to claim 19, wherein the interpolating of the second field comprises:
  calculating a first motion estimation value between the first field and the second field, a second motion estimation value between the second field and the third field, and the third motion estimation value between the first field and the third field;
  selecting a smaller value between the first motion estimation value and the second motion estimation value as the selected motion estimation value according to;
  mixing the selected motion estimation value with the third motion estimation value according to the determination of whether the one of the first and third fields have the motion change that is greater than the predetermined threshold, and calculating a first interpolation value accordingly.

24. The method according to claim 23, wherein the selecting of the smaller value between the first motion estimation value and the second motion estimation value comprises selecting between the first motion estimation value and the second motion estimation value according to whether the first or the third field has the smaller difference value in field data with respect to the second field.

25. The method according to claim 23, wherein the first interpolation value is obtained by assigning a greater weight to the selected motion estimation value than the third motion estimation value, and mixing the weighted selected motion estimation value with the weighted third motion estimation value.

26. The method according to claim 23, wherein the interpolating of the second field further comprises:
  calculating a second interpolation value using field data of the second field; and
  mixing the first interpolation value with the second interpolation value according to whether one of the first and the third fields have the motion change with respect to the second field that is greater than the predetermined threshold to interpolate the second field.

27. The method according to claim 26, wherein, if a field with a large change in motion is detected, a greater weight is assigned to the first interpolation value than the second interpolation value, and the weighted first interpolation value is mixed with the weighted second interpolation value to determine an output image.

28. A method of converting an image, the method comprising:
  receiving an image signal including a previous field, a next field, and a current field to interpolate;
  determining a first motion change between the previous field and the current field and a second motion change between the current field and the next field;
  determining a motion estimation value between the current field and one of the previous and the next fields having a smaller change in motion according to the first and second motion changes, and another motion estimation value between the previous and the next fields; and interpolating the current field according to the determined motion estimation values.

29. The method according to claim 28, wherein the interpolating of the current field comprises:
  assigning a first weight to the motion estimation value and a second weight to the another motion estimation value; and
  mixing the weighted motion estimation values to determine a temporal interpolation value of the current field.

30. The method according to claim 29, wherein:
the determining of the first and second motion changes comprises determining whether either one of the first and second motion changes is a large motion change; and
the assigning of the first weight to the motion estimation value and the second weight to the another motion estimation value comprises:
  assigning a larger weight to the another motion estimation value when neither of the first and second motion changes is the large motion change, and
  assigning a smaller weight to the another motion estimation value when one of the first and second motion changes is the large motion change.

31. The method according to claim 30, wherein the determining of the first and second motion changes comprises:
  determining the first motion change between the previous and the current fields;
  determining the second motion change between the current and the next fields; and
  comparing the first and second motion changes to determine which of the first and second motion changes is smaller and to output an indication thereof such that the one of the previous and the next fields having the smaller motion change with respect to the current field is determined.

32. The method according to claim 31, wherein the determining of the first and second motion changes further comprises comparing each of the first and second motion changes to a predetermined change threshold to determine whether the large motion change occurs between the previous, current, and next fields and to provide an indication thereof such that the first and second weights are determined accordingly.

33. A method of converting an image, the method comprising:

interpolating a current field using data from a previous field, the current field, and a next field by mixing a motion estimation value between the current field and a selected one of the previous and next fields having a smaller change in motion with respect to the current field with another motion estimation value between the previous and next fields.

34. The method according to claim 33, further comprising:

determining whether either one of the previous or the next fields have a large motion change with respect to the current field;

assigning a first weight to the another motion estimation value and a second weight to the motion estimation value such that the first weight is larger when neither of the previous and next fields have the large motion change with respect to the current field, and the second weight is larger when either one of the previous and next fields have the large motion change with respect to the current field.

35. A computer readable medium containing executable code to convert an image, the medium comprising:

a first executable code to receive an image signal including previous field, a next field, and a current field to interpolate;

a second executable code to determine a first motion change between the previous field and the current field and a second motion change between the current field and the next field;

a third executable code to determine a motion estimation value between the current field and one of the previous and the next fields having a smaller change in motion according to the first and second motion changes, and another motion estimation value between the previous and the next fields; and a fourth executable code to interpolate the current field according to the determined motion estimation values.

* * * * *

UNITED STATES PATENT AND TRADEMARK OFFICE
CERTIFICATE OF CORRECTION

PATENT NO.        : 7,593,059 B2                                             Page 1 of 1
APPLICATION NO. : 11/237958
DATED             : September 22, 2009
INVENTOR(S)       : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this

Twenty-first Day of September, 2010

David J. Kappos
*Director of the United States Patent and Trademark Office*